United States Patent [19]

Coffy

[11] Patent Number: 4,645,143
[45] Date of Patent: Feb. 24, 1987

[54] FLEXIBLE GIRDER WITH HIGH ENERGY ABSORPTION, AND LANDING GEAR AND TAIL SKID FOR AN AIRCRAFT EQUIPPED WITH SUCH A GIRDER

[75] Inventor: René L. Coffy, Sausset-Les-Pins, France

[73] Assignee: Aerospatiale Societe Nationale Industrielle, Paris, France

[21] Appl. No.: 667,672

[22] Filed: Nov. 2, 1984

[30] Foreign Application Priority Data

Nov. 2, 1983 [FR] France ................................ 83 17394

[51] Int. Cl.⁴ ............................................. B64C 25/58
[52] U.S. Cl. ................................ 244/100 R; 244/108; 244/109; 244/17.17; 267/22 R
[58] Field of Search ......... 244/100 R, 104 R, 104 LS, 244/108, 109, 17.17; 267/22 R, 8 C, 30, 158, 160

[56] References Cited

U.S. PATENT DOCUMENTS

| | | | |
|---|---|---|---|
| 2,348,101 | 5/1944 | Appel | 244/109 |
| 2,394,826 | 2/1946 | Trader | 244/109 |
| 2,534,722 | 12/1950 | Muklejohn, Jr. et al. | 244/104 LS |
| 2,636,743 | 4/1953 | Frazier | 267/30 |
| 2,641,423 | 6/1953 | Harriman et al. | 244/100 R |
| 2,767,977 | 10/1956 | Paton | 267/30 |
| 2,831,688 | 4/1958 | Knox | 52/731 |
| 3,193,221 | 7/1965 | Victorian et al. | 244/100 R |
| 3,238,690 | 3/1966 | Wilkins | 52/727 |

Primary Examiner—Galen Barefoot
Assistant Examiner—Rodney Corl
Attorney, Agent, or Firm—Armstrong, Nikaido, Marmelstein & Kubovcik

[57] ABSTRACT

The flexible girder made of composite materials and with high energy absorption is in the form of an elongate box of laminated structure comprising two rigid flanges (6,7) connected by two webs (9) which have aligned apertures (13). A deformable energy-absorbing block (14') is arranged between the two flanges (6,7) at the apertures and comprises a block of an elastomeric material (15). The block (14') absorbs the buckling deformation energy of the flange (6) which is subjected to compressive stress during flexion of the girder, by resting on the other flange (7) which is subjected to tensile stress. The block (14') controls the buckling of the flange (6) and only gives back part of the energy absorbed. Application to the equipment in particular of skid landing gear for helicopters and tail skids for aircraft.

29 Claims, 15 Drawing Figures

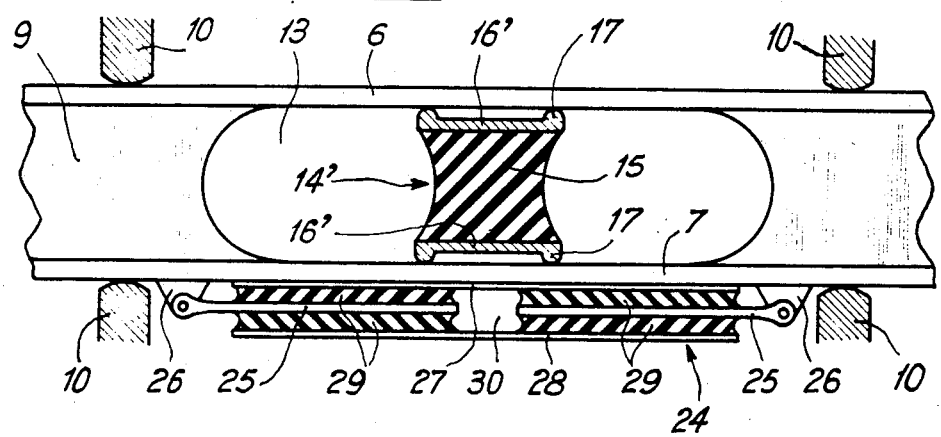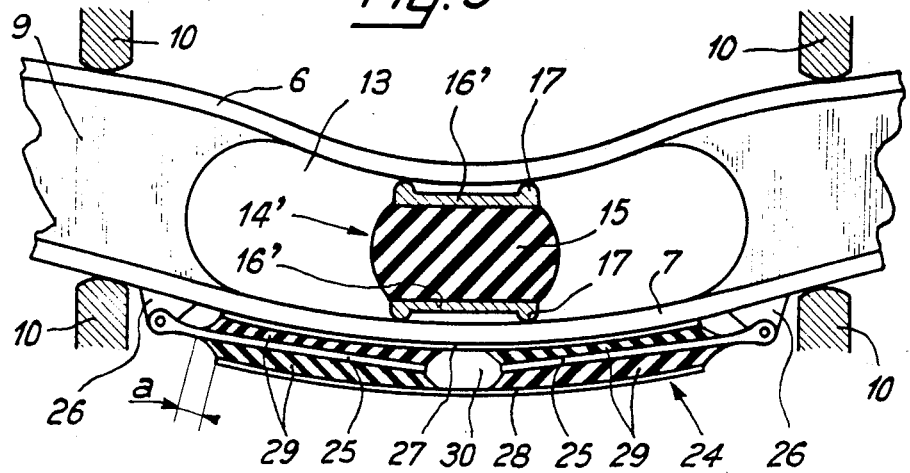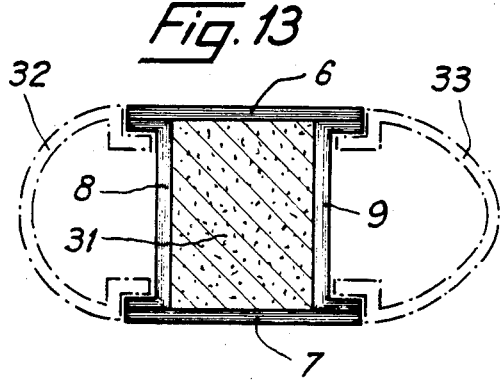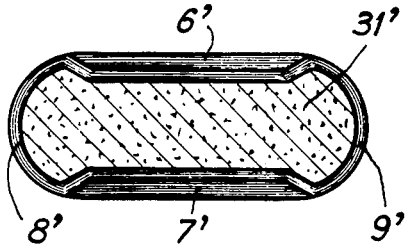

FLEXIBLE GIRDER WITH HIGH ENERGY ABSORPTION, AND LANDING GEAR AND TAIL SKID FOR AN AIRCRAFT EQUIPPED WITH SUCH A GIRDER

FIELD OF THE INVENTION

The present invention relates to a flexible girder with high energy absorption, made of composite materials, and also to landing gear, especially skid landing gear, and to a tail skid for aircraft, in particular with rotors, such as helicopters, which are equipped with such a girder intended to absorb the impact energy when the aircraft lands.

It is known that the essential functions of landing gear are to absorb, during landings, the kinetic energy arising from the speed of impact of the aircraft, and to support the latter above ground level after landing and until the following take-off, while a function of the tail skid is to protect the rear structure of aircraft equipped therewith when the latter lands with the nose up too far, preventing the rear structure from coming into contact with the ground, and correcting the excessively nose-up attitude of the aircraft. In general, helicopter tail skids are produced from a metal tube, steel for example, one end of which is arranged to be fixed beneath the rear structure of the helicopter, and the other end of which is free, curved and flattened, and is intended to come into contact with the ground during ground contacts when the helicopter approaches with the nose too far up. The skid is articulated in a vertical plane and is urged down toward an initial position, or rest position, by a flexible strut with integral shock-absorber, capable of absorbing the impact energy at relatively high vertical rates of fall, which may reach 3 meters/sec., dissipating a relatively large proportion of this absorbed energy, and only transmitting to the rear structure of the aircraft a proportion which can be withstood by the structure without damage, and permitting the excessively nose-up attitude of the aircraft to be corrected.

With regard to landing gear, it is known that the latter should not give back the whole of the energy absorbed on landing, in order to prevent the aircraft from bouncing. Part of the energy is absorbed at the level of the members in contact with the ground, such as the the wheels, equipped with pneumatic tyres, skids or skis, and another part of the energy is absorbed by the deformation of the landing gear struts connecting the members contacting the ground to the fuselage, the remainder of the energy, where necessary, being absorbed by shock-absorbing devices, when the landing gear is equipped with such devices.

In order to simplify and lighten the structure of the landing gear of light aircraft, it is a well-known procedure to produce the landing gear struts in such a way that they themselves form shock-absorbing devices. Thus there are, for example, light aircraft in which the main landing gear wheels are connected to the fuselage by cross-pieces formed by several superimposed metal slats arranged as multiple-leaf springs, and the same principle is also used on light helicopters with skid landing gear. Such a skid landing gear generally comprises two lateral skids, each composed of a metal tube, connected to each other by a front crosspiece and a rear crosspiece, each also composed of a metal tube substantially in the form of a bow of inverted U-shape, the base of which is solidly fixed to the structure of the fuselage and beneath the latter, by two connecting members arranged on either side of the central portion of the base.

In this embodiment, part of the impact energy is absorbed by the lateral friction and/or sliding on the ground of the skids which move away from each other, while the remainder of the impact energy is absorbed by the deformation of the landing gear crosspieces.

In the case of a "normal" landing, that is to say, one in which the impact speed lies within a given speed range, and in particular has a vertical speed component below a predetermined threshold, the kinetic energy is substantially absorbed by the elastic deformation of the landing gear crosspieces. By contrast, in the case of a "hard" landing, that is to say, with an impact speed beyond the given speed range, the impact energy is absorbed by plastic deformation of the crosspieces and/or skids, which should not proceed as far as the breakage of these members.

The result, however, is a permanent deformation of the crosspieces and/or skids, leading to a limited life of the landing gear, and thus to considerable, repeated and costly repair work or replacement of these members.

In fact, since the energy absorbed by elastic deformation is only a fraction of the energy absorbed by plastic deformation, if it is hoped to limit deformation to the elastic range for normally high vertical landing speeds, it is necessary to increase the dimensions of the skid landing gear, thus entailing a weight penalty.

On the other hand, if light-weight landing gear is used, the speed threshold at which permanent deformation is produced is very low, so that the landing gear rapidly becomes unusable.

BACKGROUND ART

In order to remedy the drawbacks of landing gear with metal skids and crosspieces as far as weight and irreversible deformation are concerned, it has already been proposed, in French Pat. No. 1 272 208, to use as glider or helicopter skids resilient members of synthetic material in bar form, allowing high energy absorption. These members in bar form comprise an upper boom and a lower boom, intended to absorb the tensile or compressive stresses and produced from synthetic material reinforced by glass fibre mat, as well as thrust walls connecting the two booms and composed of glass fibre reinforcements inclined at 45° to the direction of the axis of the bar, the reinforcements being embedded in the synthetic material and being connected to the booms. The bar thus formed therefore is substantially in the shape of an elongate box form provided internally with a solid core of material with a low specific weight, such as a synthetic foam material with closed cells, in order to increase the rigidity of the walls.

In French Pat. No. 1 296 381, there have already been proposed skid landing gear for light helicopters comprising struts fixed to the fuselage, carrying skids and consisting of a very resilient laminated material, for example a synthetic material which is fibre-reinforced but in which breakage occurs without previous plastic deformation, the struts being arranged so that the skids move away from each other when sliding on the ground during landing.

Finally, it is a known procedure to mount the landing gear struts resiliently on the members connecting them to the fuselage of the aircraft. This type of mounting is described in U.S. Pat. No. 2,539,817, which relates to a ski device for a light aircraft landing gear, in which the struts carrying the skis are resiliently mounted by means of resilient sleeves housed in bushes solidly connected with the struts and in which there are engaged shafts solidly fixed to the structure of the fuselage.

If the embodiments in composite materials covered by the two French Patents cited above do offer the advantage of a considerable gain in mass compared with landing gear with metal skids, the fact remains that by reason of the absence of an inherent elastic limit of the composite material, the kinetic energy due to the impact is absorbed by the elastic deformation of the skids and/or of the landing gear struts for all kinds of landing. Under these conditions, the low energy absorption capacity of the composite materials, in order to keep the same capacity as the metal landing gear, leads either to allowing the same deformation as on the metal landing gear, the consequence of which is an increase in the stress transmitted by the landing gear to the structure of the fuselage, or to allowing greater deformation, in order that the stress transmitted to the fuselage structure should be substantially the same as with metal landing gear, the consequence of which is a softening of the landing gear structure, and therefore an increased risk that the struts and/or the skids of the landing gear will collapse or break before having absorbed the impact energy.

SUMMARY OF THE INVENTION

By means of the present invention it is proposed to remedy the drawbacks described above, and the subject of the invention is a flexible girder of composite material and with high energy absorption, intended in particular for equipping landing gear and tail skids for aircraft, the girder offering a high energy absorption capacity, which can permit a decrease in the stresses transmitted by the girder to a structure with which it is associated, for example the structure of the fuselage of the aircraft, and therefore, in this particular application to landing gear, an increase in the vertical speeds of the aircraft on landing, without damage or deterioration in the performances of the various components of the landing gear, due to the dissipation of a considerable proportion of the energy absorbed by the flexible girder according to the invention. The girder can of course retain the advantages of the laminated forms made of composite materials with mineral and/or synthetic fibres and with a synthetic matrix, compared with metal forms, that is to say, a considerable saving in weight and the reversibility of deformation.

According to the invention a flexible girder of composite materials and with high energy absorption, which is substantially in the shape of an elongate box of laminated structure comprising two rigid flanges connected by two webs, is characterised in that it comprises in addition at least one deformable energy-absorbing block unit arranged between the two flanges and comprising at least one mass of elastomeric material with high deformation remanence, the block unit being intended, during deformation in flexion of the girder in a direction substantially perpendicular to the flanges, to absorb the buckling deformation energy of the flange which is subjected to compressive stress, by supporting itself on the other flange subjected to tensile stress, and to check the buckling of the compressed flange, the shock-absorbing characteristics of the block unit bringing about partial restitution of the energy absorbed, on the return of the girder to the normal position.

In a girder of this type, the flanges provide the rigidity and the strength of the girder, while the webs transmit the shearing forces, and the block unit or units therefore make it possible to control and restrain the buckling of the compressed area of the girder, and to absorb and dissipate the energy so that the girder makes it possible to achieve the maximum absorption of the stresses transmitted to a structure with which the girder is associated.

At least one of the block units, and preferably each of the block units, is advantageously arranged between aligned apertures respectively provided in the webs of the girder, which simplifies the production as far as mounting of the block unit or units is concerned, and at least one of the block units, but preferably each of them, is arranged in the central portion of the girder, in order to maintain a substantially symmetrical distribution of the stresses in the girder.

It is of advantage for at least one of the block units, but preferably each block unit, to have a stiffness characteristic which increases as a function of its deformation, in order to optimise the combination of the high energy-absorbing block unit(s) with the highly flexible laminated composite materials (without elastic limit) of the flanges and of the webs of the girder.

In an extremely simple embodiment, at least one of the block units, but preferably each block unit, comprises at least two rigid reinforcements of metal or composite materials, at least one of which is solidly connected to one of the flanges, and between which there is mounted at least one element of synthetic rubber with a high rate of hysteresis.

Each block unit can be deformed by compressive or, indeed, tensile or shearing stress, or by a combination of these different types of deformation.

According to a first embodiment, of simple structure, at least one of the block units, but preferably each of them, is composed of a block of elastomeric materials in the form of a body of revolution about an axis substantially perpendicular to the flanges, and the two end faces of which respectively adhere to the two reinforcements, which are themselves respectively solidly connected to the two flanges, the lateral face of the body of revolution being concave.

Alternatively each block unit may be of a laminated structure, and according to a second embodiment at least one of the block units, but preferably each of them, is composed of an alternating stack of thin plates of elastomeric material and of reinforcements, the thin plates each having the shape of a body of revolution round an axis substantially perpendicular to the flanges and being substantially coaxial with respect to said axis, each thin plate adhering with its two end faces to two adjacent reinforcements of the stack or to a flange and to the adjacent reinforcement of the stack, and the lateral face of each thin plate being at least partially concave. It is thus possible to limit or better control the deformation of each thin plate, and by giving the latter axial dimensions (thickness) and/or transverse dimensions which are equal or which, for example, vary progressively from one end of the stack to the other, the block units can be given a stiffness characteristic suited to the particular application envisaged.

In a third embodiment, in order to improve the solid connection of the plates of elastomeric material to the reinforcements and control the deformation of the plates, each plate has a cylindrical portion surrounded by a collar of an adjacent reinforcement to which it adheres, as well as a concave portion adjacent to the end face adhering to an adjacent reinforcement or to a flange.

According to a fourth embodiment, in which the elastomeric material is subject to shearing stress, at least one of the block units, but preferably each of them, has a tubular structure with an axis substantially perpendicular to the flanges and comprises several tubular reinforcements interleaved with tubular members of elastomeric material each of which adheres over its inner and outer surfaces to the adjacent reinforcements.

The absorption produced by the flexible girder may be improved yet further, without its weight being excessively increased thereby, if the girder comprises in addition at least one viscoelastic shock-absorber, mounted on the outer face of the flange subject to tensile stress by the deformation in flexion of the girder, and the absorption of which is added to that produced by each energy-absorbing block.

In a simple and advantageous embodiment, at least one viscoelastic shock-absorber, but preferably each of them, comprises two laminated assemblies arranged symmetrically on either side of a block unit and each comprises at least one internal reinforcement solidly connected, by its end furthest from the block, to the flange subject to tensile stress, and connected to each of two external reinforcements between which it extends, by a thin plate of elastomeric material subject to shearing stress by the deformation in flexion of the girder, the external reinforcements of the two laminated assemblies being rigidly connected to each other.

Such a light, flexible girder with high energy absorption is intended more particularly to be used in the production of landing gear for aircraft, of the type comprising members having contact with the ground, such as wheels and/or skids and/or skis, connected to the fuselage of the aircraft by at least one landing gear strut, and the invention also relates to such landing gear, which is characterised in that at least one of the struts comprises at least one girder according to the invention.

Under these conditions, the vertical impact load transmitted to the fuselage by the girder or girders is evened out and remains substantially constant during the general deformation of the struts, the girders functioning as a load limiting device.

Within the framework of this application, the invention relates more particularly to a landing gear for aircraft with one or more rotors, such as a helicopter, in which the members having contact with the ground are two lateral skids, and in which the landing gear struts are composed of a front crosspiece and a rear crosspiece, connecting the two skids to each other, and each having the shape of a bow substantially in the form of an inverted U, the base of which is solidly connected with the structure of the fuselage by two connecting members arranged on either side of the central portion of the base, the landing gear being characterised in that each of the two crosspieces is composed of a girder according to the invention, the two flanges of which are substantially vertically one above the other, the upper flange being compressed on landing and deformed by buckling between the two members connecting it to the fuselage. In a simple embodiment, the two webs of each crosspiece are cut out in the central portion of the crosspiece, which contains a single energy-absorbing block unit arranged between the two members connecting said crosspiece to the fuselage.

The webs of the crosspieces may be of a simple shape and, for example, have a recess of U-shape cross-section opening towards the outside of the crosspiece, with its base substantially perpendicular to the two flanges. If it is desired to give the crosspieces of this shape a smoother profile each may advantageously be provided with a front filler body having an external surface of substantially semi-circular cross-section, and a rear filler body having an external surface of ogival cross-section, which bodies are respectively solidly fixed against the front web and against the rear web of the crosspiece in order to give it the required profile.

It is also possible for at least one of the crosspieces, but preferably each of them, to have a substantially oval cross-section defined by a front web convex towards the front and by a rear web convex towards the rear of the crosspiece, which are respectively connected to the front edges and to the rear edges of the two flanges.

In order to obtain a landing gear having a considerable saving in weight compared with landing gear with skids and crosspieces made of steel tube, each crosspiece is solidly connected at each of its two ends to one of the two skids of laminated structure, produced from composite materials.

Flexible girders according to invention may also be used for the main wheeled landing gear of light aircraft, replacing the metal leaf crosspieces on which this type of landing gear is generally mounted, for example, or may be used in the production of a tail skid for protecting the rear structure of a helicopter during landings in an excessively nose-up attitude, and the invention finally relates to a tail skid of this type, comprising an elongate member, one end of which is intended to be fixed to the rear structure of the aircraft, and the other end of which is free and curved, and is intended to come into contact with the ground and/or support a member coming into contact with the ground, during landing with the aircraft in an excessively nose-up attitude, and the protective tail skid according to the invention is characterised in that the elongate member comprises at least one girder according to the invention.

BRIEF DESCRIPTION OF THE DRAWINGS

The invention will be understood more clearly with the aid of sample embodiments, described below on a non-limitative basis, with reference to the attached drawings, in which:

FIGS. 8 and 9 are analogous views to FIG. 4 for a crosspiece girder equipped with an additional viscoelastic shock-absorber, of the type which equips a landing gear such as that shown in FIGS. 2 and 3, and respectively under the load conditions of FIGS. 2 and 3, FIGS. 10, 11 and 12 are diagrammatic views of alternative forms of the energy-absorbing block unit.

FIGS. 13 and 14 represent cross-sections of two alternative forms of crosspiece girders, taken in a part of the girders which is neither the cut-out central portion, nor an end for connection to a skid.

DESCRIPTION OF THE PREFERRED EMBODIMENT

Figure 1:
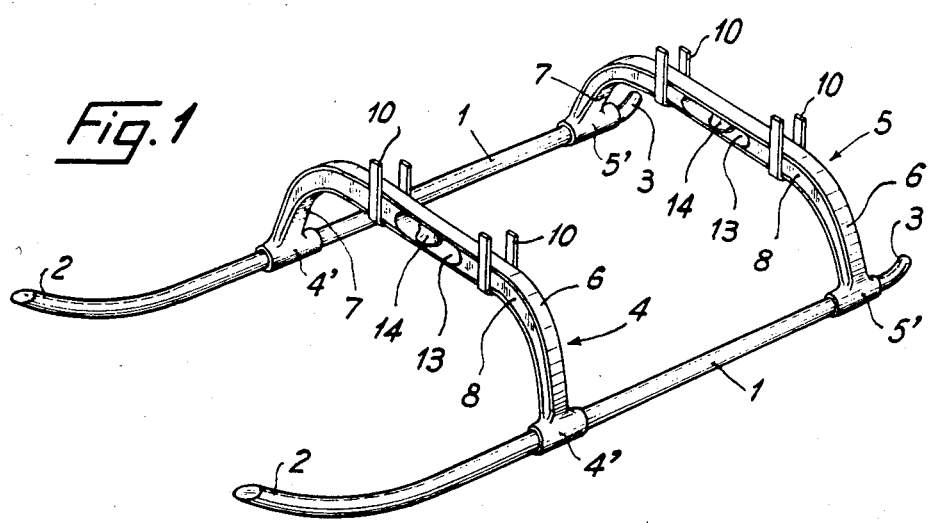
FIG. 1 is a perspective view of one example of a skid landing gear for a light helicopter.

With reference to FIG. 1, the skid landing gear for a light helicopter comprises two lateral skids 1, being in the shape of tubes curved slightly upwards at their two ends 2 and 3, and produced by means of a laminated structure of composite materials with mineral and/or synthetic fibres of high mechanical strength embedded in a synthetic matrix. The skids 1 are, for example, produced by means of strips of carbon fibre or glass fibre fabric, or of the material marketed under the trademark Kevlar, bonded in an epoxy resin.

Between their curved ends at the front 2 and at the rear 3, the two skids 1 are connected to each other by a front crosspiece 4 and by a rear crosspiece 5 which, in this example, are identical. Each of the two crosspieces 4 and 5 is composed of a flexible girder comprising an upper flange 6 and a lower flange 7, which are connected to each other by a front web 8 and a rear web 9. The latter is not visible in FIG. 1, but appears in FIGS. 2 to 4, 8, 9 and 13. The crosspiece girders 4 and 5 have a laminated box structure made of composite materials also with synthetic or mineral fibres embedded in a synthetic matrix, and they may also be produced, like the skids 1, with strips of carbon fibre or glass fibre fabric or Kevlar bonded in an epoxy resin.

The two webs 8 and 9 of each crosspiece girder 4 and 5 extend substantially in vertical planes perpendicular to the longitudinal axis of symmetry of the helicopter, and each crosspiece girder 4 and 5 is in the shape of an inverted U-shaped bow. The flanges 6 and 7 impart rigidity and strength to the crosspiece girders 4 and 5, while the webs 8 and 9 effect the transmission of the shearing forces between the two flanges. Each crosspiece 4 and 5 is intended to be fixed rigidly and removably to lhe structure of the fuselage 12 of the helicopter by two connecting members 10, which may be of any suitable known type, for example, with seatings solidly connected to structural braces of the fuselage and with metal flanges bolted on to the seatings, clamping two laterally separated portions of the base of the bow, or central horizontal portion, of the crosspieces 4 and 5 in complementary recesses of corresponding shape, with the interpolation of a protective packing of elastomer rubber 11. In the central portion of each crosspiece 4 and 5, between the two corresponding members 10 for connection to the fuselage, the two webs 8 and 9 of each crosspiece 4 and 5 are cut out and each crosspiece 4 and 5 thus has a central transverse aperture 13.

Figure 2:
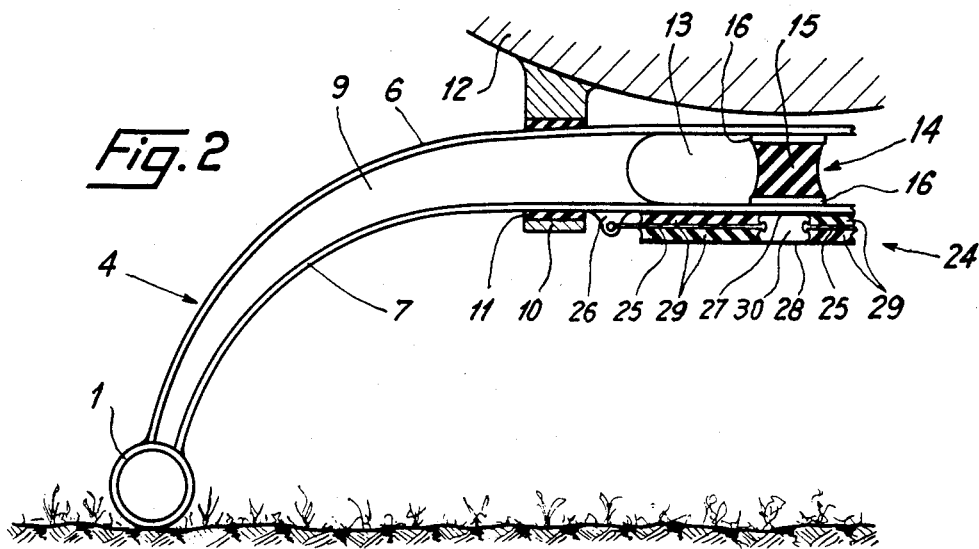
FIG. 2 is a partial diagrammatic view in a section through a vertical and transverse plane passing through the front crosspiece, of the landing gear in FIG. 1, equipped with an additional viscoelastic shock-absorber, and in the position which it assumes, on landing, at the moment when the skids come into contact with the ground, or on take-off, just before the skids leave the ground.
Figure 3:
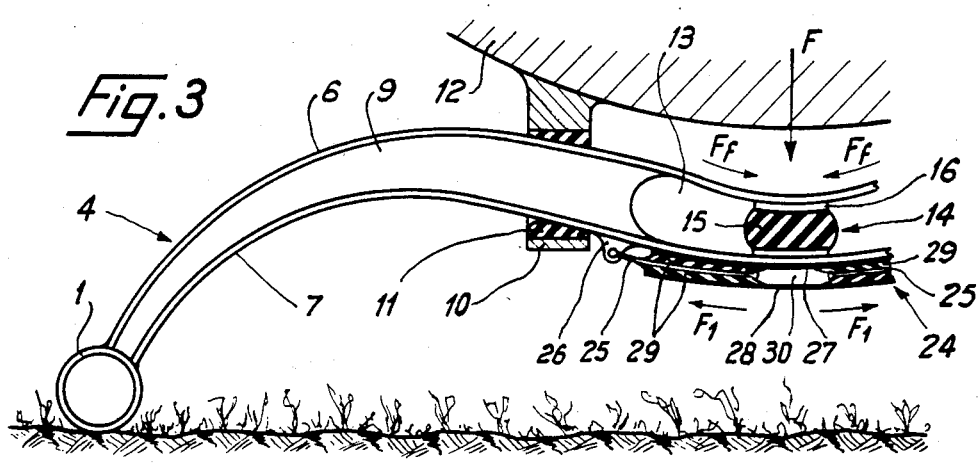
FIG. 3 is an analogous view to FIG. 2, representing the skid landing gear on landing, some moments after the skids have come into contact with the ground, FIG. 4.is a partial diagrammatic view, in a section through the same plane as FIGS. 2 and 3, illustrating the method of operation of a flexible girder constituting a crosspiece of a skid landing gear such as shown in FIGS. 1 to 3, FIGS. 5, 6 and 7 are graphs representing the bending or compressive stress respectively of a crosspiece girder according to FIG. 4 without an energy-absorbing block unit, of an energy-absorbing block unit, and of a crosspiece girder according to FIG. 4 with its energy-absorbing block unit.

In this central aperture 13 there is arranged an energy-absorbing block unit 14, formed, as shown in FIGS. 2 and 3, by a deformable block of a synthetic material 15 with high deformation remanence fixed between two rigid reinforcements 16 also produced from laminated composite materials. The synthetic material is, for example, an elastomer rubber with a high rate of hysteresis, and the rubber block 15 is in the general shape of a cylinder of circular section with a slightly concave lateral surface, of which the upper and lower flat end faces adhere by vulcanisation or bonding to the lower flat face of the upper reinforcement 16 and to the upper flat face of the lower reinforcement 16 respectively. The two reinforcements 16 each have the shape of a flat circular disc and the upper reinforcement 16 is rigidly fixed by its upper flat face to the lower or inner surface of the upper flange 6, while the lower reinforcement 16 is rigidly fixed by its lower flat face to the upper or inner face of the lower flange 7.

Figure 4:
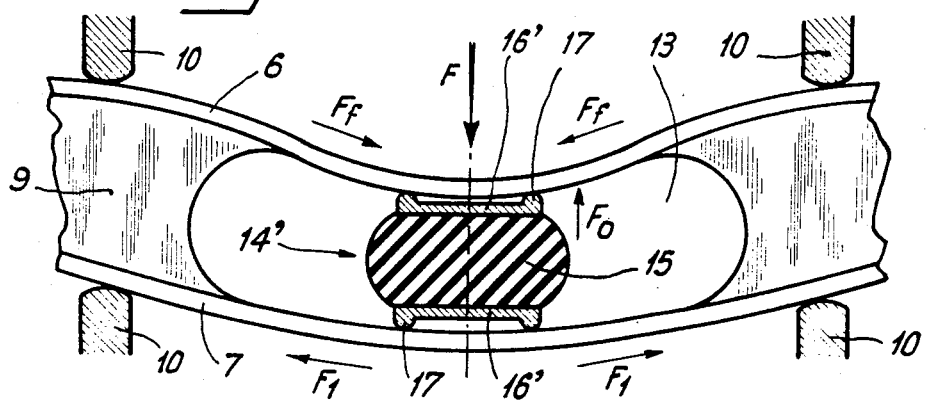

The flexible crosspiece girder made of laminated composite materials which is shown in FIG. 4, and whose mountings provided by the connecting members have been indicated very diagrammatically, includes a block unit 14', the rigid reinforcement 16' of which only rest against the inner faces of the flanges 6 and 7 by means of lateral ribs 17.

When two crosspiece girders such as that in FIG. 4 form, part of a skid landing gear such as that in FIG. 1, on landing, during the impact of the skids 1 on the ground, the skids 1 transmit to the crosspieces 4 and 5 forces which cause the latter to flex, under the bending effect of a vertical load F (see FIG. 4) due to the weight of the helicopter. The result is that the two skids 1 move sideways away from each other, sliding on the ground, and that by the deformation in flexion of each of the crosspiece girders 4 and 5, the lower flange 7 of each girder 4 and 5 is subjected to a tensile force $F_1$, while the upper flange 6 is subjected to a compressive force $F_f$ and deforms by buckling. By resting on the lower flange 7, the block unit 14', which is crushed and deforms under compression, absorbing energy thereby, exerts on the upper flange 6 a reaction force $F_O$ which is opposed to the load F. The block unit 14' therefore fulfils the function of controlling and restraining the buckling of the compressed upper flange 6, and the function of absorbing the buckling deformation energy of the upper flange 6, while supporting itself on the stretched lower flange 7.

Figure 5:
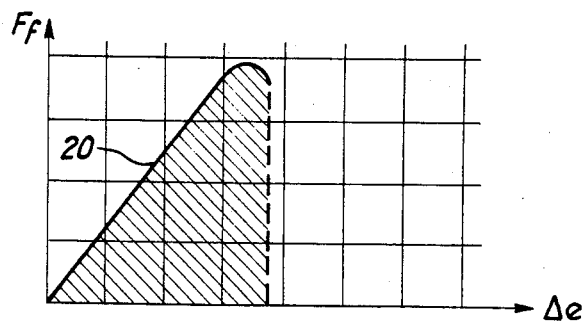

In FIG. 5, there is represented by the curve 20 the evolution of the compressive stress $F_f$ of the upper flange 6 as a function of the buckling deformation $\Delta e$ of the flange 6, in a girder such as that shown in FIG. 4, but not including an energy-absorbing block unit 14' in the cut-out central portion 13 of the girder. It is to be observed, that the stress $F_f$ increases linearly with the buckling deformation $\Delta e$ and then, shortly after passing through a maximum stress, the upper flange 6 breaks under the compressive stress, which is represented by the dotted line.

Figure 6:
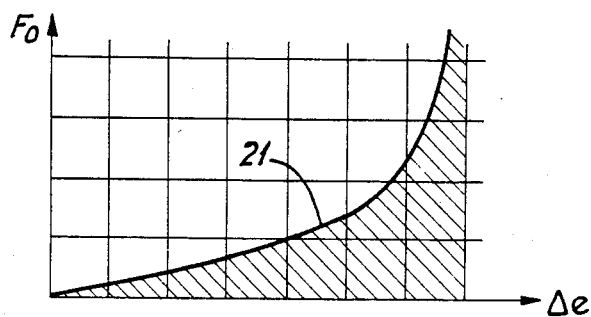

In FIG. 6, there is represented by the curve 21 the development of the reaction force $F_O$ opposed by an energy-absorbing block unit 14' to a force which compressed it axially, as a function of the crushing or the reduction in the height $\Delta e$ of the block unit 14' under the compressive stress. It is to be observed that the block unit 14' has a stiffness characteristic which increases as a function of its deformation, that is to say, the slope of the curve 21 increases with the deformation Δe.

Figure 7:
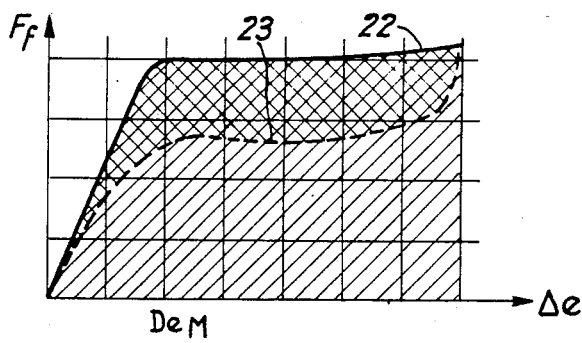

The result of this, for a girder equipped with its energy-absorbing block unit 14', and as represented in FIG. 4, is the development of the compressive stress $F_f$ as a function of the buckling deformation Δe such as that represented by the curve 22 in FIG. 7. This curve 22 shows that after a deformation $Δe_m$ the stress transmitted to the fuselage 12 is substantially constant and maintained at a level which the structure of the fuselage can take without damage, during the general deformation of the flexible bows which form the two crosspiece girders. In fact, the shock-absorbing characteristics of the block unit 14', fixed to the central portion on the one hand of the upper flange 6, which buckles progressively, and on the other hand of the lower flange 7, produce a high energy-absorption capacity, as is also shown in FIG. 7. In this Figure, the kinetic energy arising from the impact speed of the helicopter, and absorbed on landing, is represented by the area defined between the curve 22 and the axis of the deformation Δe, while the energy dissipated by the girder and its block unit 14' corresponds to the area contained between the two curves 22 and 23, and the energy given back corresponds to the difference between these two areas, that is to say, to the areas defined between the curve 23 and the deformation axis Δe, if one disregards the energy dissipated by the friction of the skids 1 on the ground when they move sideways away from each other. There is thus obtained a crosspiece girder which absorbs the main part of the impact energy by its elastic deformation, which dissipates a large proportion of it and, on returning to the normal position, only gives back a limited portion in order to avoid bouncing, without permanent deformation of the crosspiece for all landings, and which makes it possible to reduce the stresses transmitted to the structure of the helicopter and to increase the rates of descent of the latter which can be accommodated without damage to the crosspiece 4 or 5. In addition to these basic advantages, it is to be observed that the crosspiece girder 4 or 5 thus produced remains very simple to produce and allows a considerable saving in weight compared with landing gear with metal skids and crosspieces; this lightening may, for example, reach 35 kilos for a light helicopter intended to transport 5 passengers.

The absorption provided by a crosspiece girder thus formed may be further improved if there is added to the structure already described a viscoelastic shock-absorber such as 24 in FIGS. 2 and 3. The shock-absorber 24, mounted beneath the cut-out central portion 13 of the crosspiece girder 4 or 5 has a laminated structure comprising two symmetrical assemblies mounted on either side of the energy-absorbing block unit 14. Each of these two assemblies is composed of a central rigid reinforcing plate 25, made of composite materials of mineral and/or synthetic fibres immersed in a synthetic resin matrix, which is mounted to pivot by its end furthest from the other assembly and from the block unit 14 on a fixing lug 26 solidly connected with the lower face of the lower flange 7. The central reinforcing plate 25 extends, with clearance, between two external rigid reinforcing plates, also made of composite materials, of which one, 27, is adjacent to the lower flange 7, and the other, 28, extends beneath the central reinforcing plate 25. The central reinforcing plate 25 is connected to each of the two reinforcing plates 27 and 28 by a thin plate 29 of elastomeric material, which is preferably the same as that which is used to produce the block 15 of the block unit 14. Each of the thin plates 29 adheres by one of its two flat faces to the central reinforcing plate 25 and by its other flat face to one of the external reinforcing plates 27 and 28, either by bonding or by vulcanisation. The two external reinforcing plates 27 and 28 are common to the two symmetrical laminated assemblies, that is to say, each of the two external reinforcing plates 27 and 28 of the laminated assemblies is connected to each of the two central reinforcing plates 25 by a thin plate 29, the four thin plates 29 and the two central reinforcing plates 25 of the viscoelastic shock-absorber 24 defining a space 30 between the two external reinforcing plates 27 and 28 and between the two symmetrical assemblies of the shock-absorber. In FIG. 2, the viscoelastic shock-absorber 24 is shown in its rest position. In FIG. 3, however, which shows the crosspiece girder 4 deformed in flexion shortly after the impact, as described above with reference to FIG. 4, under the stress which loads the upper flange in compression $F_f$ and causes it to buckle, compressing the block 14, the tensile force $F_1$ which loaded the lower flange 7 in the embodiment shown in FIG. 4 is opposed by the viscoelastic shock-absorber 24. The two central reinforcing plates are therefore pulled apart from each other while the two external reinforcing plates 27 and 28, of which one, 27, may be fixed to the lower flange 7, remain substantially in place, the four thin plates 29 being subjected to shearing stress.

A viscoelastic shock-absorber 24 may, of course, be fitted to a crosspiece girder such as that in FIG. 4, as shown in FIGS. 8 and 9, showing respectively the configuration at rest and under load on impact, analogous to the configurations in FIGS. 2 and 3. In FIG. 9 there is to be observed in particular the amplitude "a" of the shearing deformation of the thin plates 29, when the crosspiece girder is deformed in flexion.

Figure 10:
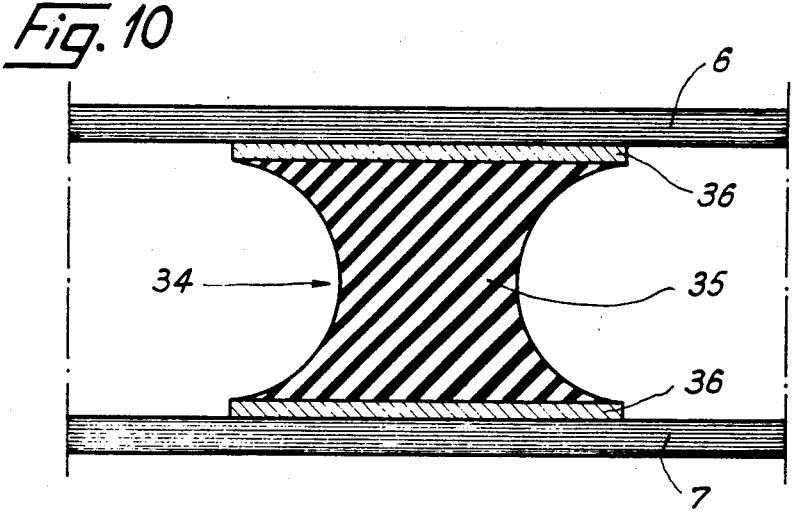
Figure 11:
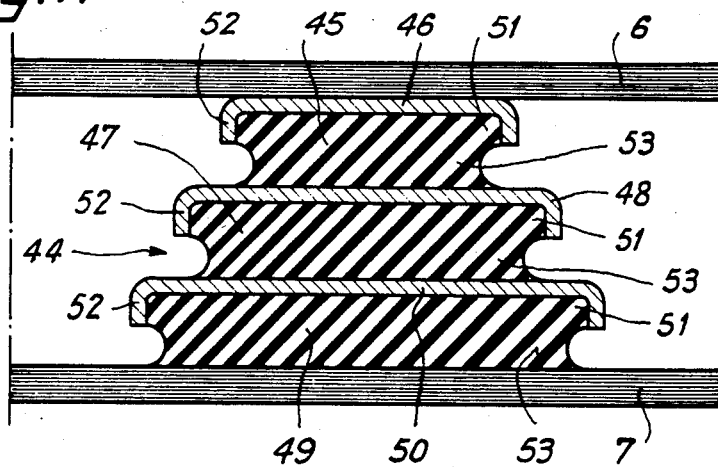
Figure 12:
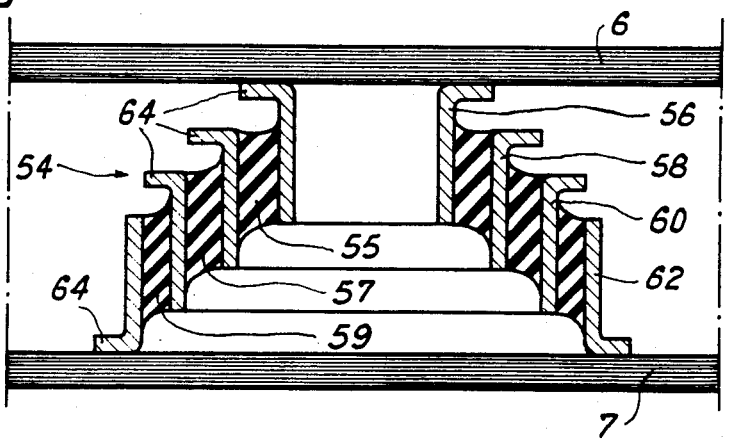

FIGS. 10 to 12 show three different embodiments of energy absorbing block units. In the embodiment in FIG. 10, similar to that shown in FIG. 2, the block unit 34 is composed of a solid block of elastomer 35, in the form of a body of revolution about an axis perpendicular to the two laminated flanges 6 and 7, and the lateral surface of which is concave and is defined, in an axial half-section, by a substantially semicircular recess, the block 35 being solidly connected by its two upper and lower flat end faces respectively with the lower and upper flat faces respectively of two upper and lower rigid reinforcing discs 36, themselves solidly connected respectively by their upper and lower flat face to the upper flange 6 and lower flange 7. When the block unit 34 is deformed by the flexing of the girder and the buckling of the upper flange 6, it is loaded in compression and the block of elastomer 35 is deformed by bulging out, as shown in FIGS. 3 and 9 for the block 15, the rest position of which is shown in FIGS. 2 and 8.

In FIG. 11, the energy-absorbing block unit 44, also of a type loaded in compression by the flexion of the girder and the buckling of the upper flange 6, has a laminated structure and is composed of an alternating stack of three thin plates 45, 47 and 49 of elastomer and of three rigid reinforcements 46, 48 and 50 of composite materials. Each reinforcement 46, 48 and 50 is in the form of a disc, the edge of which is turned down substantially perpendicular to the plane of the central portion of the disc and forms a collar 52. Each thin plate 45, 47 and 49 is in the shape of a body of revolution about an axis perpendicular to the flanges 6 and 7, and has a cylindrical portion 51, by the outer surface of which each thin plate 45, 47 and 49 is solidly fixed in the collar 52 and against the corresponding flat face of the central portion of a respective reinforcement 46, 48 or 50, and each thin plate 45, 47 and 49 also has a portion with a concave lateral surface 53 connecting itself, on one side, to the cylindrical portion 51, and bordered on the other side by a flat face solidly connecting it to an adjacent reinforcement 48 or 50, or to the lower flange 7.

The three reinforcements 46, 48 and 50 have the same thickness or axial dimension, but have transverse dimensions or diameters which increase progressively from the reinforcement 46 situated at the upper end of the stack, and by the upper flat face of which the block unit 44 is solidly connected with the lower face of the upper flange 6, to the lower reinforcement 50. Equally, the thin plates 45, 47 and 49 have the same thickness but have diameters which correspond respectively to the internal diameters of the collars 52 of the reinforcements 46, 48 and 50, and therefore increase progressively from the upper thin plate 45 of the stack to the lower thin plate 49, situated at the lower end of the stack, and the lower flat face of which, adjacent to the portion with a concave outer surface 53, is solidly connected with the upper flat face of the lower flange 7. This embodiment ensures that the block unit 44 has a longer life and makes it possible to control its deformation better.

In FIG. 12, the energy absorbing block unit 54 is of a type subjected to shearing stress when it is deformed by the flexion of the girder and the buckling of the upper flange 6. The block unit 54 has a tubular, telescopic structure, having an axis perpendicular to the two flanges 6 and 7. It is formed by partial nesting of tubular members which are alternately rigid and made of elastomer rubber with a high rate of hysteresis. The block 54 comprises four rigid tubular reinforcements 56, 58, 60 and 62, which are coaxial and with progressively increasing radii, each having an outer radial collar 64 at one end. The four rigid reinforcements 56, 58, 60 and 62 are arranged, with a radial clearance, one inside the other over the major part of their length, and they have their collar 64 at their upper end, except for the reinforcement 62 with the largest diameter, the collar 64 of which it at the lower end of the block 54. Three rings of elastomer rubber 55, 57 and 59, also tubular in shape, and with progressively increasing radii, are each arranged between two adjacent tubular reinforcements of the block unit 54, and each adheres respectively by its inner and outer lateral surfaces to lhe outer lateral surface of the tubular reinforcement 56, 58 or 60 which it surrounds and to the inner lateral surface of the tubular reinforcement 58, 60 or 62 by which it is surrounded. The block unit 54 thus produced is solidly connected with the lower face of the upper flange 6 by the collar 64 of the upper reinforcement 56, of smallest diameter, and to the upper face of the lower flange 7 by the collar 64 of the lower reinforcement 62, of largest diameter.

The cross-section through a crosspiece girder such as 4 or 5 which is shown in FIG. 13 clearly displays the box structure of the girder, formed by the laminated upper flange 6 and lower flange 7, as well as by the laminated front web 8 and rear web 9, each having a recess of U-shaped section opening towards the outside of the girder box. The girder is filled, except in its cut-out central portion 13, with a core 31 of a synthetic material with low specific gravity, for example with closed cells, which increases the rigidity of the girder.

In order to streamline the profile of the crosspieces 4 and 5, a front filler body 32 having an external surface of semicircular cross-section, and a rear filler body 33 having an external surface of ogival cross-section, both also made of composite materials, may be solidly fitted respectively on the front of the front web 8 and on the rear of the rear web 9.

The connection of the front crosspiece 4 and rear crosspiece 5 to the skids is effected by sleeves 4' and 5' made of strips of composite materials wound round the skids 1 and solidly connected with the crosspieces 4 and 5 in the recesses formed by the U-shaped webs 8 and 9.

FIG. 14 shows a cross-section through an alternative form of profiled crosspiece of oval cross-section. The laminated upper flange 6' and lower flange 7' are lodged in recesses open to the top and bottom and provided in a laminated closed box of oval cross section, of which the portion which is convex towards the front forms the front web 8' and the portion which is convex towards the rear forms the rear web 9', the box being filled with a core 31' of cellular synthetic material.

Figure 15:
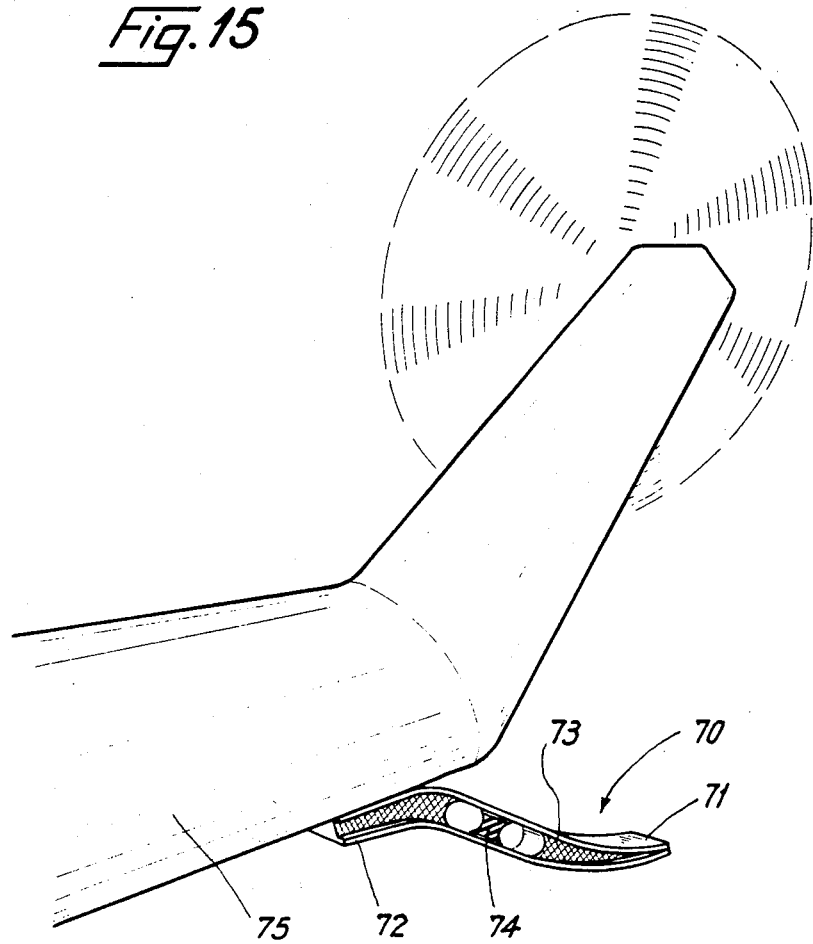
FIG. 15 shows diagrammatically the rear portion of a helicopter equipped with a protective tail skid according to the invention.

Light, flexible girders such as those just described may also be used in the production of wheeled landing gear for light aircraft, as well as in the production of a tail skid, as is shown in FIG. 15.

In FIG. 15, a girder 70, curved in an S-shape, and also composed of a laminated box structure comprising an upper flange 71 and a lower flange 72, connected to each other by lateral webs such as 73, cut out in their central portion, with an energy-absorbing block 74 housed between the flanges 71 and 72, in the recess thus defined, is rigidly fixed by one end beneath the rear structure 75 of a helicopter. The other end of the girder 70, which is thinned down and is such that the upper flange 71 and lower flange 72 are practically joined directly to each other, is intended to come into contact with the ground, during landings in an excessively nose-up attitude, so that the girder 70 absorbs the impact energy and dissipates a large part of it by the deformation of the block 74, under conditions which are very similar to the operating conditions of the crosspiece girders 4 and 5 described above.

In the symmetrical embodiments desoribed above with reference to FIGS. 11 and 12, it should be noted that the deformable thin plates and the rigid reinforcements are coaxial, but it is clear than in certain applications it may be of interest to give the energy-absorbing block unit an asymmetrical structure.

In an analogous manner, the box structure shown in FIG. 13 has webs 8 and 9 in which the base of the U is perpendicular to the flanges 6 and 7, but it is clear that the base of the U could be inclined with respect to the flanges 6 and 7.

I claim:

1. A flexible girder made of composite materials and with high energy absorption, having substantially the shape of an elongate box of laminated structure comprising two rigid flanges connected by two webs, characterized in that it comprises in addition at least one deformable energy-absorbing block unit arranged between the two flanges and comprising at least one block of an elastomeric material with high deformation remanence, the block unit being intended, when the girder is deformed in flexion in a direction substantially perpendicular to the flanges, to absorb the buckling deformation energy of the flange which is subjected to compressive stress, by resting on the other flange which is subjected to tensile stress, and to control the buckling of the compressed flange, the absorption characteristic of the block bringing about partial restitution of the energy absorbed, when the girder returns to the normal position, at least one of the block units being arranged between two aligned apertures, respectively provided in the webs of the girder.

2. A girder according to claim 1, characterized in that at least one of the block units is arranged in the central portion of the girder.

3. A girder according to claim 1, characterized in that at least one of the block units has a stiffness characteristic which increases as a function of its deformation.

4. A girder according to claim 1, characterized in that at least one of the block units comprises at least two rigid reinforcements, of which at least one is solidly connected to one of the flanges, and between which there is mounted at least one elastomeric element with a high rate of hysteresis.

5. A girder according to claim 1, characterized in that at least one of the block units is deformed by a compressive stress.

6. A girder according to claim 1, characterized in that at least one of the block units is deformed by a shearing stress.

7. A girder according to claim 5, characterized in that at least one of the block units is composed of a block of elastomeric material in the form of a body of revolution about an axis substantially perpendicular to the flanges and the two end faces of which each adhere to one of two reinforcements, themselves each solidly connected with one of the two flanges, the lateral face of the body of revolution being concave.

8. A girder according to claim 5, characterized in that at least one of the block units is on a laminated structure.

9. A girder according to claim 8, characterized in that at least one of the block units is composed of an alternating stack of thin plates of elastomeric material and of reinforcements, the thin plates each having the shape of a body of revolution about an axis substantially perpendicular to the flanges and being substantially coaxial with respect to said axis, each thin plate adhering by one of its end faces to one of an adjacent reinforcement of the stack and one flange and by its other end face to the adjacent reinforcement of the stack, and the lateral face of each thin plate being at least partially concave.

10. A girder according to claim 9, characterized in that the different thin plates have the same axial dimensions.

11. A girder according to claim 9, characterized in that the different thin plates have axial dimensions which vary progressively from one end of the stack to the other.

12. A girder according to claim 11, characterized in that the lateral face of each thin plate has a cylindrical portion surrounded by a collar of a reinforcement and adhering to the collar, and a concave portion adjacent to said one of the end faces of the thin plate.

13. A girder according to claim 6 characterized in that at least one of the block units is of a laminated structure.

14. A girder according to claim 8, characterized in that at least one of the block units has a tubular structure with an axis substantially perpendicular to the flanges and comprises several tubular reinforcements which fit partially one inside the other, each reinforcement being joined to the reinforcement inside which it fits and/or to the reinforcement which fits inside it, by an annulus of elastomeric material adhering by its inner and outer faces to the external and internal surfaces respectively of the two corresponding adjacent reinforcements.

15. A girder according to claim 1, characterized in that it comprises in addition at least one viscoelastic shock-absorber, mounted on the outer face of the flange which is subjected to tensile stress by the deformation in flexion of the girder, and the damping of which is added to that produced by each energy-absorbing block unit.

16. A girder according to claim 15, characterized in that at least one viscoelastic shock-absorber comprises two laminated assemblies arranged symmetrically on either side of a block unit and each comprising at least one internal reinforcement solidly connected, by its end furthest from the block unit, to the flange which is subjected to tensile stress and connected to each of two external reinforcements, between which it extends, by a thin plate of elastomeric material subjected to shearing stress by the deformation in flexion of the girder, the external reinforcements of the two laminated assemblies being rigidly connected to each other.

17. A landing gear for an aircraft, of the type comprising members intended to come into contact with the ground connected to the fuselage of the aircraft by at least one landing gear strut, characterized in that at least one of the struts comprises at least one flexible girder made of composite materials and with high energy absorption, having substantially the shape of an elongate box of laminated structure comprising two rigid flanges connected by two webs, and in addition at least one deformable energy-absorbing block unit arranged between the two flanges, which block unit comprises at least one block of an elastomeric material with high deformation remanence, the block unit being intended, when the girder is deformed in flexion in a direction substantially perpendicular to the flanges, to absorb the buckling deformation energy of the flange which is subjected to compressive stress, by resting on the other flange which is subjected to tensile stress, and to control the buckling of the compressed flange, the absorption characteristic of the block bringing about partial restitution of the energy absorbed, when the girder returns to the normal position, at least one of the block units being arranged between two aligned apertures, respectively provided in the webs of the girder.

18. A landing gear for an aircraft with at least one rotor, such as a helicopter, in which the members coming into contact with the ground are two lateral skids, the landing gear struts of which are formed by a front crosspiece and a rear crosspiece, connecting the two skids to each other, and each being in the form of a bow substantially in an inverted U-shape, the base of which is firmly secured to the structure of the fuselage by two connecting members arranged on either side of the central portion of the base, characterized in that each of the two crosspieces is formed by a flexible girder made of composite materials and with high energy absorption, having substantially the shape of an elongate box of laminated structure comprising two rigid flanges which are substantially vertically one above the other, the upper flange being compressed on landing and deformed by buckling between the two connecting members, the flanges being connected by two webs, and comprising in addition at least one deformable energy-absorbing block unit arranged between the two flanges in the central portion of the base, which unit includes at least one block of an elastomeric material with high deformation remanence, the block unit being intended, when the girder is deformed in flexion in a direction substantially perpendicular to the flanges, to absorb the buckling deformation energy of the upper flange which is subjected to compressive stress, by resting on the lower flange which is subjected to tensile stress, and to control the buckling of the upper flange, the absorption characteristic of the block bringing about partial restitution of the energy absorbed, when the girder returns to the normal position.

19. A landing gear according to claim 18, characterized in that the two webs of each crosspiece are apertured in the central portion of the crosspiece which contains a single energy-absorbing block unit arranged between the two members connecting it to the fuselage.

20. A landing gear according to claim 19, characterized in that the webs of at least one crosspiece form recesses of U-shaped cross-section opening towards the outside of the crosspiece, and the base of each recess is substantially perpendicular to the two flanges.

21. A landing gear according to claim 20, characterized in that at least one crosspiece comprises a front filler body having an external surface of substantially semi-circular cross-section and a rear filler body having an external surface of ogival cross-section which are fixed respectively against the front web and against the rear web of the crosspiece in order to give it a profiled section.

22. A landing gear according to claim 18, characterized in that at least one crosspiece has a substantially oval cross-section defined by a front web which is convex towards the front and a rear web which is convex towards the rear of the crosspiece, and which are connected respectively with the front edges and the rear edges of the two flanges.

23. A landing gear according to claim 18, characterized in that each crosspiece is solidly connected by each of its ends with one of the two skids which are of laminated structure and made of composite materials.

24. A tail skid for the protection of the rear structure of an aircraft, comprising an elongate member, one end of which is intended to be fixed to the rear structure of the aircraft and the other end of which is free and curved, characterized in that the elongate member comprises at least one girder made of composite materials and with high energy absorption, having substantially the shape of an elongate box of laminated structure comprising two rigid flanges one above the other connected by two webs, and in addition at least one deformable energy-absorbing block unit arranged between the two flanges, which block unit comprises at least one block of an elastomeric material with high deformation remanence, the block unit being intended, when the girder is deformed in flexion in a direction substantially perpendicular to the flanges, to absorb the buckling deformation energy of the flange which is subjected to compressive stress, by resting on the other flange which is subjected to tensile stress, and to control the buckling of the compressed flange, the absorption characteristic of the block bringing about partial restitution of the energy absorbed, when the girder returns to the normal position, at least one of the block units being arranged between two aligned apertures, respectively provided in the webs of the girder.

25. A girder according to claim 4, characterized in that the rigid reinforcements are made of metal.

26. A girder according to claim 4, characterized in that the rigid reinforcements are made of composite materials.

27. A girder according to claim 9, characterized in that the different thin plates have the same transverse dimensions.

28. A girder according to claim 9, characterized in that the different thin plates have transverse dimensions which vary progressively from one end of the stack to the other.

29. A girder according to claim 28, characterized in that the lateral face of each thin plate has a cylindrical portion surrounded by a collar of a reinforcement and adhering to the collar, and a concave portion adjacent to said one of the end faces of the thin plate.

* * * * *